July 23, 1940.                J. BOWLING, JR                    2,208,891
                              VEHICLE FOR CHILDREN
                              Filed April 24, 1939            2 Sheets-Sheet 1
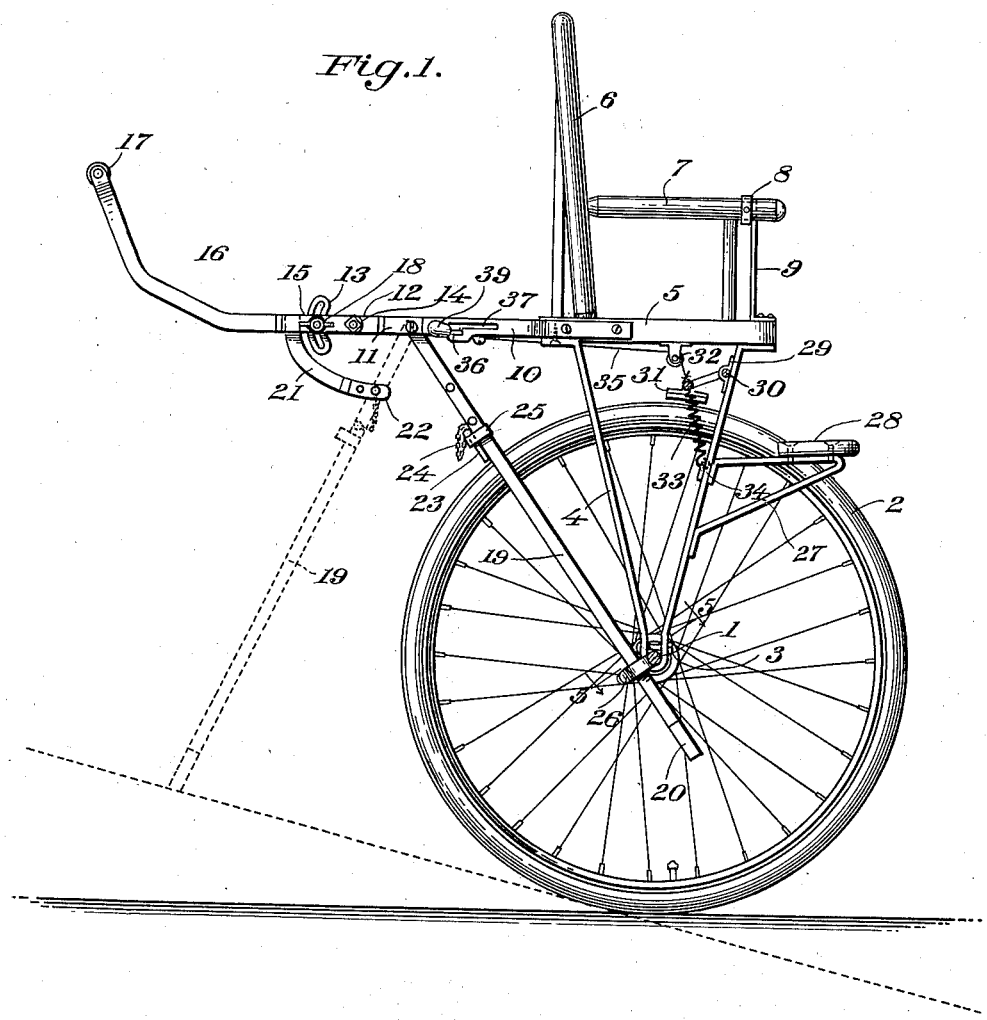
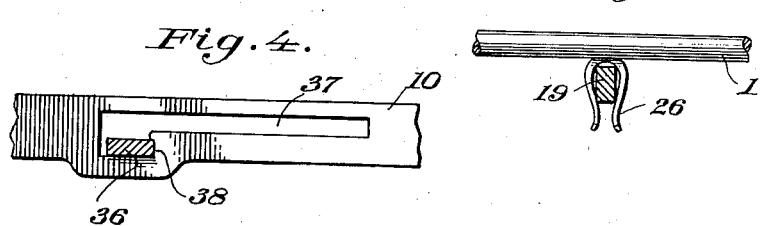
Jerome Bowling Jr. INVENTOR
BY Victor J. Evans & Co.
ATTORNEYS July 23, 1940.        J. BOWLING, JR        2,208,891
VEHICLE FOR CHILDREN
Filed April 24, 1939        2 Sheets-Sheet 2
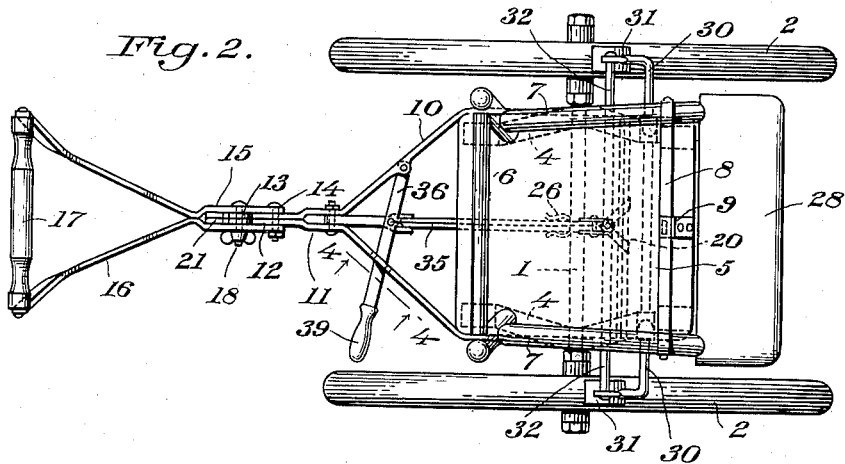
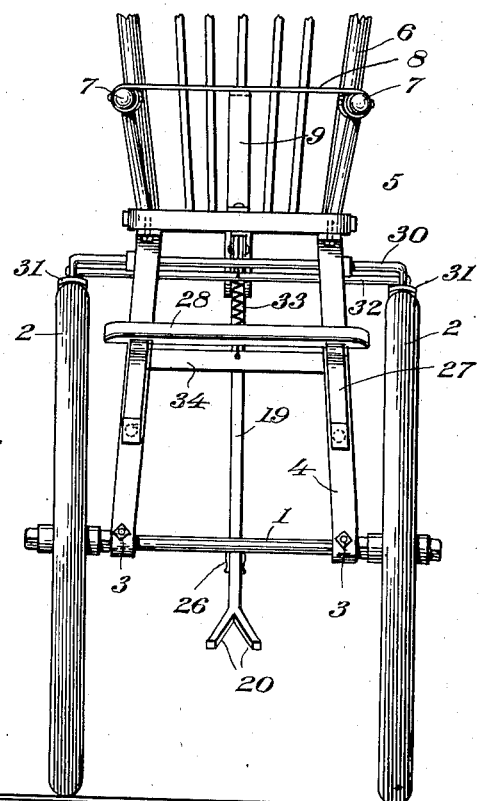
Jerome Bowling Jr. INVENTOR
ATTORNEYS Patented July 23, 1940

2,208,891

UNITED STATES PATENT OFFICE 2,208,891

VEHICLE FOR CHILDREN

Jerome Bowling, Jr., Shreveport, La.

Application April 24, 1939, Serial No. 269,728

2 Claims. (Cl. 280—60)

This invention relates to vehicles designed for children, and its general object is to provide a vehicle in the form of a go-cart, that can be handled and propelled in an easy and expeditious manner and with minimum effort, in that it includes two wheels of relatively great diameter, preferably of the pneumatic rubber tired type generally used on bicycles and the vehicle is properly balanced when the handle thereof is held at a convenient level for pushing the same.

A further object is to provide a two wheeled vehicle that includes adjustable handle means to vary the height thereof for the convenience of the attendant in pushing the vehicle, and in order to bring about the proper balance of the vehicle body with respect to its axle regardless of the height of the attendant.

A further object is to provide a two wheeled vehicle that includes ground engaging prop means for supporting the body in an upright position when the vehicle is not in use, as well as brake means to not only retard and stop movement of the vehicle when being propelled, but also to cooperate with the prop means for holding the vehicle against casual movement especially on an inclined surface, the brake being constantly urged to braking position, but normally held out of said position.

A further object is to provide a vehicle of the character set forth, that is safe for use in conveying children, even of tender age, and the vehicle is simple in construction, inexpensive to manufacture, and extremely efficient in operation, use and service.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a side view partly in section of the child's vehicle which forms the subject matter of the present invention with the ground engaging prop means in normal position in full lines and in position for use in dotted lines.

Figure 2 is a top plan view of the vehicle.

Figure 3 is a front elevation thereof, with parts broken away.

Figure 4 is a sectional view taken approximately on line 4—4 of Figure 2, looking in the direction of the arrows.

Figure 5 is a sectional view taken approximately on line 5—5 of Figure 1, looking in the direction of the arrows.

Referring to the drawings in detail, the reference numeral 1 indicates the axle which like the other metal parts of my vehicle is preferably made from suitable rust proof material, such as chrome steel, and journaled on the axle adjacent to the ends thereof are wheels 2, the latter being preferably of the pneumatic rubber tired type generally used on bicycles, as shown.

Secured to the axle 1 by bolt and nut connections 3 are the apex ends of substantially V-shaped body frame members 4 that rise from the axle and have their remote ends outwardly directed and bolted or otherwise secured to the undersurface of the seat 5 which includes a back 6 and arms 7, as well as a safety strap 8 bridging the arms, with an upright 9 between the strap 8 and the seat, it being obvious that in the form as shown the strap and upright 9 are made from metal but leather safety means may be used for that purpose, as will be apparent.

Secured to the sides of the seat 5 are the parallel portions of supporting frame members 10 which extend from the parallel portions in converging relation with respect to each other and into outer parallel portions 11 disposed in close proximity to each other, and thence into engaging portions 12 that have formed thereon an arcuate slotted guide member 13.

The engaging portions 12 have pivotally secured thereto for disposal upon opposite sides thereof and inwardly of the guide member 13, as at 14, the parallel portions 15 of handle frame members 16 which from their parallel portions 15 are disposed in diverging relation with respect to each other, and are bent at an upward inclination as best shown in Figure 1. Bridging the outer ends of the handle frame members 16 is a handle bar 17, and due to the pivot 14, it will be obvious that the handle is adjustable to various heights and it is held in adjusted position through the instrumentality of a bolt and nut connection 18, the bolt extending through the parallel portions 15 as well as through the slot of the guide member 13, and the nut is of the wing type, as shown.

Pivotally secured between the outer parallel portions 11 is the upper end of a rod like prop 19, for supporting the body of the vehicle in an upright position, when not in use, as shown in dotted lines in Figure 1, and the lower end of the prop 19 terminates in a pair of diverging ground engaging members 20. The prop is held in its operative or dotted line position, by a bracket 21 that is secured to and between the parallel portions 15 of the handle frame members to extend forwardly therefrom in curved formation, and the outer end of the bracket 21 is bifurcated to provide arms 22 for the disposal of the prop between the same. The arms have registering openings therein to register with an opening in the prop for receiving a pin 23 for securing the prop fixed with respect to the bracket, and the pin which is connected to the prop by a chain 24 is received in a keeper 25 carried by the prop when the latter is not in use, as shown in full lines in Figure 1. The prop is held in its full line position through the instrumentality of a substantially U-shaped spring clamp 26 welded or otherwise secured to the axle 1, as best shown in Figure 5.

It will be noted that in the form of vehicle shown, that the seat is in the form of a chair, and it may be suitably upholstered if desired, and I preferably provide a footrest which includes a pair of substantially V-shaped brackets 27 having angle ends welded or otherwise secured to the forward portions of the V-shaped body frame members 4, for the disposal of the brackets at a slight upward inclination, and bridging and secured to the upper portions of the brackets 27 is a flat cross member 28 for disposal in the path of the feet of the child, as will be apparent upon inspection of Figure 1.

Mounted in bearings 29 secured to the forward portions of the V-shaped body frame members 4 for rocking movement, is the brake rod 30 of the brake for my vehicle, and the rod has its ends bent for disposal rearwardly, with brake shoe plates secured to the outer ends and curved to follow the transverse curvature of the tire, as shown, the plates 31 having suitable wear shoes fixed thereto for engagement with the tires. The bent portions of the brake rod 30 have a brace rod 32 secured to and bridging the same, and connected to the brace rod 32 midway its ends is one end of a coil spring 33 which has its opposite end connected midway between the ends of a bar 34 that is secured to and bridges the frame members 4, as best shown in Figure 3.

The coil spring 33 constantly urges and holds the brake in applied position, but it is normally held out of said position, by handled means which includes a cable 35 having one end connected to the brace rod 30 and its opposite end to a hand lever 36 which is pivotally connected to one supporting frame member 10 and extends through a slot 37 in the other supporting frame member, as best shown in Figure 2, the slot being enlarged at one end to provide a stop shoulder 38 for the lever which is flat as shown, and when engaged with the shoulder, the brake is held out of applied position, as will be apparent. The lever 36 is provided with a hand grip 39.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A two wheeled vehicle comprising an axle, wheels journaled thereon, body frame means secured to and rising from the axle, seating means secured to the upper end of the body frame means, supporting frame means secured to and extending rearwardly from the seating means and terminating in outwardly engaged end portions, arcuate slotted means formed on the engaged end portions, a handle including frame members pivotally secured to said engaged portions and extending therefrom in diverging relation with respect to each other, a handle bar bridging the outer ends of the handle frame members, and a bolt and nut connection having the bolt thereof extending through the handle frame members and slotted means for holding the handle in adjusted positions.

2. A two wheeled vehicle comprising an axle, wheels journaled thereon, body frame means secured to and rising from the axle, seating means secured to the upper end of the body frame means, handled supporting frame means secured to and extending rearwardly and horizontally from the seating means, a rod like prop having its upper end pivotally connected to the supporting frame means and terminating at its lower end in a pair of diverging ground engaging members, a curved bracket secured to and depending forwardly from the supporting frame means and having a bifurcated forward end providing arms to receive the prop between the same, means for securing the prop to the arms with the diverging members engaging the ground for supporting the body of the vehicle in an upright position when the vehicle is not in use, and spring clamping means secured to the axle for receiving and holding the prop out of use.

JEROME BOWLING, Jr.